(12) United States Patent
Arise et al.

(10) Patent No.: US 10,693,115 B2
(45) Date of Patent: Jun. 23, 2020

(54) NONAQUEOUS ELECTROLYTE SECONDARY BATTERY SEPARATOR

(71) Applicant: Sumitomo Chemical Company, Limited, Tokyo (JP)

(72) Inventors: Ichiro Arise, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/910,580

(22) Filed: Mar. 2, 2018

(65) Prior Publication Data

US 2018/0254459 A1 Sep. 6, 2018

(30) Foreign Application Priority Data

Mar. 3, 2017 (JP) ................. 2017-041084

(51) Int. Cl.
*H01M 2/16* (2006.01)
*H01M 2/14* (2006.01)
*H01M 10/0525* (2010.01)

(52) U.S. Cl.
CPC ......... *H01M 2/1653* (2013.01); *H01M 2/145* (2013.01); *H01M 2/1686* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 9,508,975 B1 | 11/2016 | Matsuo | |
| 2012/0028101 A1 | 2/2012 | Ishihara et al. | |
| 2012/0028102 A1 | 2/2012 | Ishihara et al. | |
| 2012/0028131 A1 | 2/2012 | Ishihara et al. | |
| 2012/0034518 A1 | 2/2012 | Ishihara et al. | |
| 2012/0034519 A1 | 2/2012 | Ishihara et al. | |
| 2012/0040232 A1 | 2/2012 | Ishihara et al. | |
| 2013/0034769 A1 | 2/2013 | Takagi et al. | |
| 2015/0037653 A1 | 2/2015 | Saito et al. | |
| 2017/0033348 A1 | 2/2017 | Murakami et al. | |
| 2017/0125766 A1 | 5/2017 | Harumoto et al. | |
| 2017/0162849 A1 | 6/2017 | Murakami et al. | |
| 2017/0162850 A1 | 6/2017 | Murakami et al. | |
| 2017/0341035 A1 | 11/2017 | Sato et al. | |
| 2018/0342721 A1 | 11/2018 | Murakami et al. | |

FOREIGN PATENT DOCUMENTS

| | | |
|---|---|---|
| CN | 102781667 A | 11/2012 |
| CN | 105580160 A | 5/2016 |
| CN | 106410096 A | 2/2017 |
| JP | 11130900 A | 5/1999 |
| JP | 2007141498 A | 6/2007 |
| KR | 2012-0003864 A | 1/2012 |
| KR | 2013-0059783 A | 6/2013 |
| KR | 2015-0003177 A | 1/2015 |
| KR | 20160088434 A | 7/2016 |
| KR | 2016-0094846 A | 8/2016 |
| KR | 2017-0019348 A | 2/2017 |
| WO | 2016/104789 A1 | 6/2016 |

OTHER PUBLICATIONS

Office Action dated Mar. 21, 2018 in KR Application No. 10-2018-0025245.
Office Action dated Apr. 3, 2019 in CN Application No. 201810175247.5.
Office Action dated Aug. 22, 2018 in KR Application No. 10-2018-0025245.
Office Action dated Apr. 17, 2020 in CN Application No. 20181017547.5.

*Primary Examiner* — Wyatt P McConnell
(74) *Attorney, Agent, or Firm* — Panitch Schwarze Belisario & Nadel LLP

(57) ABSTRACT

As a nonaqueous electrolyte secondary battery separator used to produce a nonaqueous electrolyte secondary battery which is low in resistance increasing rate in a case where the nonaqueous electrolyte secondary battery is repeatedly subjected to a charge-discharge cycle, the present invention provides a nonaqueous electrolyte secondary battery separator which includes a polyolefin porous film, the nonaqueous electrolyte secondary battery separator having ion permeability barrier energy of not less than 300 J/mol/μm and not more than 900 J/mol/μm.

8 Claims, No Drawings

NONAQUEOUS ELECTROLYTE SECONDARY BATTERY SEPARATOR

This Nonprovisional application claims priority under 35 U.S.C. § 119 on Patent Application No. 2017-041084 filed in Japan on Mar. 3, 2017, the entire contents of which are hereby incorporated by reference.

TECHNICAL FIELD

The present invention relates to (i) a separator for a nonaqueous electrolyte secondary battery (hereinafter referred to as a "nonaqueous electrolyte secondary battery separator"), (ii) a member for a nonaqueous electrolyte secondary battery (hereinafter referred to as a "nonaqueous electrolyte secondary battery member"), and (iii) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

A device equipped with a lithium ion battery includes a wide variety of electrical protection circuits, provided in a battery charger or a battery pack, so that the battery operates normally and safely. For example, if a breakdown or a malfunction occurs in the protection circuits, the lithium ion battery may be continuously recharged. This may cause oxidative and reductive degradation of an electrolyte on surfaces of a positive electrode and a negative electrode both of which generate heat, oxygen release caused by decomposition of a positive electrode active material, and even deposition of metallic lithium on the negative electrode. This may eventually cause the lithium ion battery to fall into a thermal runaway. There is also a danger that ignition or explosion may occur in the lithium ion battery, depending on the situation.

In order to safely stop a battery before such a dangerous thermal runaway occurs, most lithium ion batteries currently include, as a separator, a porous base material which contains a polyolefin as a main component and which has a shutdown function of clogging pores present in the porous base material when a temperature inside the battery is raised due to some defect and reaches approximately 130° C. to 140° C. Exhibition of the shutdown function at a temperature rise inside the battery stops passage of ions in the separator, and thus allows the battery to safely stop.

As a porous base material useful as a nonaqueous electrolyte secondary battery separator, Patent Literature 1 discloses, for example, a polyethylene microporous film which has a flexion rate, a porosity, and an average pore diameter each falling within a specific range so that (i) a film thickness and a porosity necessary for development of strength are maintained and (ii) high ion permeability is achieved.

CITATION LIST

Patent Literature

[Patent Literature 1]
Japanese Patent Application Publication Tokukaihei No. 11-130900 (published on May 18, 1999)

SUMMARY OF INVENTION

Technical Problem

A nonaqueous electrolyte secondary battery which includes a nonaqueous electrolyte secondary battery separator constituted by a conventional porous film as disclosed in Patent Literature 1 is (i) high in rate of increase in resistance (electrode resistance) (hereinafter referred to as a resistance increasing rate) in a case where the nonaqueous electrolyte secondary battery is repeatedly subjected to a charge-discharge cycle as described above and (ii) therefore poor in cycle characteristic.

Solution to Problem

In view of the above problem, the inventors of the present invention focused their attention on a relationship between (i) ion permeability barrier energy of a nonaqueous electrolyte secondary battery separator (hereinafter, also referred to as simply a "separator") and (ii) a resistance increasing rate in a case where a nonaqueous electrolyte secondary battery including the nonaqueous electrolyte secondary battery separator was repeatedly subjected to a charge-discharge cycle, although no one had focused their attention on such a relationship. The inventors then found that a nonaqueous electrolyte secondary battery which includes a separator that has ion permeability barrier energy falling within a specific range per unit film thickness is (i) low in resistance increasing rate in a case where the nonaqueous electrolyte secondary battery is repeatedly subjected to a charge-discharge cycle and (ii) therefore excellent in cycle characteristic, and arrived at the present invention.

The present invention encompasses aspects described in the following [1] to [4].

[1] A nonaqueous electrolyte secondary battery separator including a polyolefin porous film,
the nonaqueous electrolyte secondary battery separator having ion permeability barrier energy of not less than 300 J/mol/µm and not more than 900 J/mol/µm per unit film thickness.

[2] The nonaqueous electrolyte secondary battery separator as described in [1], further including an insulating porous layer which is provided on one surface or each of both surfaces of the polyolefin porous film.

[3] A nonaqueous electrolyte secondary battery member including: a positive electrode; a nonaqueous electrolyte secondary battery separator as described in [1] or [2]; and a negative electrode, the positive electrode, the nonaqueous electrolyte secondary battery separator, and the negative electrode being disposed in this order.

[4] A nonaqueous electrolyte secondary battery including a nonaqueous electrolyte secondary battery separator as described in [1] or [2].

Advantageous Effects of Invention

A nonaqueous electrolyte secondary battery separator in accordance with an embodiment of the present invention makes it possible for a nonaqueous electrolyte secondary battery including the nonaqueous electrolyte secondary battery separator to be low in resistance increasing rate in a case where the nonaqueous electrolyte secondary battery is repeatedly subjected to a charge-discharge cycle. Accordingly, the nonaqueous electrolyte secondary battery separator makes it possible for the nonaqueous electrolyte secondary battery to be excellent in cycle characteristic.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that a numerical expression "A to B" herein means "not less than A and not more than B" unless otherwise stated.

Embodiment 1

A nonaqueous electrolyte secondary battery separator in accordance with Embodiment 1 of the present invention is a nonaqueous electrolyte secondary battery separator including a polyolefin porous film, the nonaqueous electrolyte secondary battery separator having ion permeability barrier energy of not less than 300 J/mol/μm not more than 900 J/mol/μm per unit film thickness.

The nonaqueous electrolyte secondary battery separator in accordance with Embodiment 1 of the present invention includes a polyolefin porous film, and is preferably constituted by a polyolefin porous film. Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, with respect to the whole of materials of which the porous film is made.

The polyolefin porous film can be a base material of the nonaqueous electrolyte secondary battery separator in accordance with an embodiment of the present invention. The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3\times10^5$ to $15\times10^6$. In particular, the polyolefin-based resin more preferably contains a high molecular weight component having a weight-average molecular weight of not less than 1,000,000, because the polyolefin porous film has greater strength.

Examples of the polyolefin-based resin which is a main component of the polyolefin porous film include, but are not particularly limited to, homopolymers (for example, polyethylene, polypropylene, and polybutene) and copolymers (for example, ethylene-propylene copolymer) each of which homopolymers and copolymers is a thermoplastic resin and is produced through (co)polymerization of a monomer(s) such as ethylene, propylene, 1-butene, 4-methyl-1-pentene, and/or 1-hexene.

The polyolefin porous film can be a layer containing any one of these polyolefin-based resins solely or can be alternatively a layer containing two or more of these polyolefin-based resins. Of these polyolefin-based resins, polyethylene is preferable because it is possible to prevent (shut down) a flow of an excessively large electric current at a lower temperature. In particular, high molecular weight polyethylene which contains ethylene as a main component is more preferable. Note that the polyolefin porous film can contain a component other than polyolefin, provided that the component does not impair a function of the layer.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Of these polyethylenes, ultra-high molecular weight polyethylene having a weight-average molecular weight of not less than 1,000,000 is still more preferable, and ultra-high molecular weight polyethylene which contains a high molecular weight component having a weight-average molecular weight of $5\times10^5$ to $15\times10^6$ is particularly preferable.

A film thickness of the polyolefin porous film is not particularly limited, but is preferably 4 μm to 40 μm, and more preferably 5 μm to 20 μm.

The film thickness of the polyolefin porous film is preferably not less than 4 μm, because the polyolefin porous film having such a film thickness makes it possible to sufficiently prevent an internal short circuit of the nonaqueous electrolyte secondary battery.

On the other hand, the film thickness of the polyolefin porous film is preferably not more than 40 μm, because the polyolefin porous film having such a film thickness makes it possible to prevent an increase in size of the nonaqueous electrolyte secondary battery.

The polyolefin porous film typically has a weight per unit area of preferably 4 g/m² to 20 g/m², and more preferably 5 g/m² to 12 g/m², so as to allow the nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, because the polyolefin porous film having such an air permeability exhibits sufficient ion permeability.

The polyolefin porous film has a porosity of preferably 20% by volume to 80% by volume, and more preferably 30% by volume to 75% by volume, so as to (i) retain an electrolyte in a larger amount and (ii) obtain a function of absolutely preventing (shutting down) a flow of an excessively large electric current at a lower temperature.

The pores which the polyolefin porous film has each have a pore diameter of preferably not more than 0.3 μm, and more preferably not more than 0.14 μm, in view of sufficient ion permeability and of prevention of entry of particles, constituting an electrode, into the polyolefin porous film.

The ion permeability barrier energy per unit film thickness is represented by a value obtained by dividing, by a film thickness of the nonaqueous electrolyte secondary battery separator, activation energy (barrier energy) which ions (for example, $Li^+$), which are charge carriers, consume while passing through the nonaqueous electrolyte secondary battery separator in a case where a nonaqueous electrolyte secondary battery is operated.

In a case where the ion permeability barrier energy per unit film thickness is low, it is possible for the ions to easily pass through the separator. In other words, interaction between (i) the charge carriers and (ii) a resin wall inside the separator is weak. In a case where the ion permeability barrier energy per unit film thickness is high, it is not possible for the ions to easily pass through the separator. In other words, the interaction between (i) the charge carriers and (ii) the resin wall inside the separator is strong.

According to the nonaqueous electrolyte secondary battery separator in accordance with an embodiment of the present invention, the ion permeability barrier energy is not less than 300 J/mol/μm and not more than 900 J/mol/μm per unit film thickness. This makes it possible to control, to an appropriate speed, a speed at which the ions, which are charge carriers, pass through the nonaqueous electrolyte secondary battery separator in a case where the nonaqueous electrolyte secondary battery including the nonaqueous electrolyte secondary battery separator is operated.

In a case where the ion permeability barrier energy is excessively low and, accordingly, the speed at which the ions pass through the nonaqueous electrolyte secondary battery separator is excessively high, the ions become nonexistent in an electrode (positive electrode) when a charge-discharge cycle is repeated. It is considered that this fact causes a deterioration of the electrode and ultimately causes a resistance increasing rate to be high in a case where the charge-discharge cycle is repeated.

Therefore, by arranging the ion permeability barrier energy so as to be not less than 300 J/mol/μm per unit film thickness, it is possible to prevent the deterioration of the electrode and, accordingly, possible to cause the resistance increasing rate to be low in a case where the charge-discharge cycle is repeated. Under the circumstances, the ion permeability barrier energy is preferably not less than 320 J/mol/μm, more preferably not less than 350 J/mol/μm, per unit film thickness.

In a case where the ion permeability barrier energy is excessively high and, accordingly, the above-described ion permeability is excessively low, thermal stress and mechanical stress, applied to the nonaqueous electrolyte secondary battery separator while the ions pass through the nonaqueous electrolyte secondary battery separator, are increased when the charge-discharge cycle is repeated. It is considered that this fact causes a change in internal structure (pore structure) of the nonaqueous electrolyte secondary battery separator and ultimately causes the resistance increasing rate to be high in a case where the charge-discharge cycle is repeated.

Furthermore, in a case where the ion permeability barrier energy is excessively high, it is considered that the resin wall inside the nonaqueous electrolyte secondary battery separator has an excessively high polarity. In this case, a highly polar by-product, which is derived from a nonaqueous electrolyte and which is generated in a case where the nonaqueous electrolyte secondary battery is operated, clogs voids in the nonaqueous electrolyte secondary battery separator. This may cause the resistance increasing rate to be high in a case where the charge-discharge cycle is repeated.

Under the circumstances, the ion permeability barrier energy is preferably not more than 800 J/mol/μm, more preferably not more than 780 J/mol/μm, per unit film thickness.

The ion permeability barrier energy per unit film thickness of the nonaqueous electrolyte secondary battery separator in accordance with an embodiment of the present invention is calculated by the following method.

First, the nonaqueous electrolyte secondary battery separator in accordance with an embodiment of the present invention is cut into a disc-shaped piece having a diameter of 17 mm. The disc-shaped piece is sandwiched between two SUS plates each having a thickness of 0.5 mm and a diameter of 15.5 mm. An electrolyte is injected into a cell thus obtained so as to prepare a coin cell (CR2032 type). As the electrolyte, a solution is used which is obtained by dissolving $LiPF_6$ in a mixed solvent, in which ethylene carbonate (EC), ethyl methyl carbonate (EMC), and diethyl carbonate (DEC) are mixed at a volume ratio of 3:5:2, so that the $LiPF_6$ has a concentration of 1 mol/L.

Next, the coin cell thus prepared is placed in a thermostatic bath in which a temperature is set to a given temperature (later described), and a Nyquist plot is obtained with use of an alternating current impedance apparatus (FRA 1255B) and CellTest System (1470E), each manufactured by Solartron, while a frequency is set to 1 MHz to 0.1 Hz and an amplitude is set to 10 mV. A solution resistance $r_0$ of the separator at the given temperature is determined from a value of an X intercept, and then the ion permeability barrier energy is calculated with use of the following expressions (1) and (2). Note that the temperature of the thermostatic bath is set to 50° C., 25° C., 5° C., and −10° C.

Note, here, the ion permeability barrier energy is represented by the following expression (1).

$$k=1/r_0=A\ exp(-Ea/RT) \quad (1)$$

Ea: ion permeability barrier energy (J/mol)
k: a reaction constant
$r_0$: a solution resistance (Ω)
A: a frequency factor
R: a gas constant=8.314 J/mol/K
T: a temperature of a thermostatic bath (K)

In a case where natural logarithms of both sides of the expression (1) are taken, the following expression (2) is obtained. On the basis of the expression (2), −Ea/R is determined which indicates a slope of a straight line obtained by (i) plotting $ln(1/r_0)$ with respect to a reciprocal of each temperature and (ii) applying a least squares method to a plot thus obtained, and then Ea is calculated by multiplying a value of −Ea/R by a gas constant R. Subsequently, Ea thus calculated is divided by the film thickness of the separator. In this way, the ion permeability barrier energy per unit film thickness is calculated.

$$ln(1/k)=ln(1/r_0)=lnA-Ea/RT \quad (2)$$

The film thickness of the separator is not particularly limited, but is preferably 4 μm to 40 μm, and more preferably 5 μm to 20 μm.

The film thickness of the separator is preferably not less than 4 μm, because the separator having such a film thickness makes it possible to sufficiently prevent an internal short circuit of the nonaqueous electrolyte secondary battery.

On the other hand, the film thickness of the separator is preferably not more than 40 μm, because the separator having such a film thickness makes it possible to prevent an increase in size of the nonaqueous electrolyte secondary battery.

The separator typically has a weight per unit area of preferably 4 $g/m^2$ to 20 $g/m^2$, and more preferably 5 $g/m^2$ to 12 $g/m^2$, so as to allow the nonaqueous electrolyte secondary battery to have a higher weight energy density and a higher volume energy density.

The separator has an air permeability of preferably 30 sec/100 mL to 500 sec/100 mL, and more preferably 50 sec/100 mL to 300 sec/100 mL, in terms of Gurley values, because the separator having such an air permeability exhibits its sufficient ion permeability.

The separator has a porosity of preferably 20% by volume to 80% by volume, and more preferably 30% by volume to 75% by volume, so as to (i) retain an electrolyte in a larger amount and (ii) obtain a function of absolutely preventing (shutting down) a flow of an excessively large electric current at a lower temperature.

Pores which the separator has each have a pore diameter of preferably not more than 0.3 μm, and more preferably not more than 0.14 μm, in view of sufficient ion permeability and of prevention of entry of particles, constituting an electrode, into the separator.

The nonaqueous electrolyte secondary battery separator in accordance with an embodiment of the present invention may further include an adhesive layer, a heat-resistant layer, a protective layer, and/or the like, as needed, in addition to the polyolefin porous film.

[Method for Producing Polyolefin Porous Film]

Examples of a method for producing the polyolefin porous film include, but are not particularly limited to, a method in which (i) a polyolefin-based resin, a petroleum resin, and a plasticizer are kneaded and then extruded to obtain a sheet-shaped polyolefin resin composition, (ii) the sheet-shaped polyolefin resin composition thus obtained is stretched, (iii) part or all of the plasticizer is removed with use of an appropriate solvent, and (iv) a resultant polyolefin resin composition is dried and heat-fixed.

Specifically, the Method can be a Method Including the Following Steps of:

(A) melt-kneading a polyolefin-based resin and a petroleum resin in a kneader to obtain a melted mixture;
(B) kneading the melted mixture thus obtained and a plasticizer to obtain a polyolefin resin composition;
(C) extruding, through a T-die of an extruder, the polyolefin resin composition thus obtained, and shaping the polyolefin resin composition into a sheet while cooling the polyolefin resin composition, to obtain a sheet-shaped polyolefin resin composition;
(D) stretching the sheet-shaped polyolefin resin composition thus obtained;
(E) cleaning, with use of a cleaning liquid, a resultant stretched polyolefin resin composition; and
(F) drying and heat-fixing a resultant cleaned polyolefin resin composition to obtain a polyolefin porous film.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the petroleum resin include: (i) aliphatic hydrocarbon resins each obtained through polymerization of a C5 petroleum fraction, such as isoprene, pentene, and pentadiene, serving as a main material; (ii) aromatic hydrocarbon resins each obtained through polymerization of a C9 petroleum fraction, such as indene, vinyltoluene, and methyl styrene, serving as a main material; (iii) copolymer resins of the aliphatic hydrocarbon resins and/or the aromatic hydrocarbon resins; (iv) alicyclic saturated hydrocarbon resins obtained through hydrogenation of the resins (i) to (iii); and (v) varying mixtures of the resins (i) to (iv). The petroleum resin is preferably an alicyclic saturated hydrocarbon resin. The petroleum resin has a characteristic that the petroleum resin is easily oxidized because the petroleum resin has, in its structure, many unsaturated bonds and many tertiary carbon atoms each of which unsaturated bonds and tertiary carbon atoms easily produces a radical.

By mixing the petroleum resin into the polyolefin resin composition, it is possible to adjust the interaction between (i) the charge carriers and (ii) a resin wall inside the polyolefin porous film to be obtained. In other words, it is possible to suitably adjust the ion permeability barrier energy of the separator.

By mixing the polyolefin-based resin with the petroleum resin which is oxidized more easily than the polyolefin-based resin, it is possible to appropriately oxidize the resin wall inside the polyolefin porous film to be obtained. That is, in a case where the petroleum resin is added to the polyolefin resin composition, the separator to be obtained has great ion permeability barrier energy, as compared with a case where the petroleum resin is not added to the polyolefin resin composition.

The petroleum resin preferably has a softening point of 90° C. to 125° C. The petroleum resin is used in an amount of preferably 0.5% by weight to 40% by weight, and more preferably 1% by weight to 30% by weight, with respect to 100% by weight of the polyolefin resin composition to be obtained.

Examples of the plasticizer include: phthalate esters such as dioctyl phthalate; unsaturated higher alcohols such as oleyl alcohol; saturated higher alcohols such as paraffin wax and stearyl alcohol; and liquid paraffin.

In the step (B), a temperature inside the kneader at a time when the plasticizer is added to the kneader is preferably not lower than 135° C. and not higher than 200° C., and more preferably not lower than 140° C. and not higher than 170° C.

By controlling the temperature inside the kneader so as to fall within the above range, it is possible to add the plasticizer to the melted mixture of the polyolefin-based resin and the petroleum resin while the polyolefin-based resin and the petroleum resin are suitably mixed together. This makes it possible to more suitably obtain an effect of mixing the polyolefin-based resin with the petroleum resin.

For example, in a case where the temperature inside the kneader at the time when the plasticizer is added to the melted mixture of the polyolefin-based resin and the petroleum resin is excessively low, it is not possible to uniformly mix the polyolefin-based resin with the petroleum resin and, accordingly, may not be possible to appropriately oxidize the resin wall inside the polyolefin porous film. In a case where the temperature is excessively high (for example, not lower than 200° C.), these resins may be deteriorated by heat.

In the step (D), the sheet-shaped polyolefin resin composition can be stretched merely in a machine direction (MD) or alternatively merely in a transverse direction (TD) or alternatively in both of the MD and the TD. Examples of a method for stretching the sheet-shaped polyolefin resin composition in both of the MD and the TD include: a sequential two-way stretching method in which the sheet-shaped polyolefin resin composition is stretched in the MD and then stretched in the TD; and a simultaneous two-way stretching method in which the sheet-shaped polyolefin resin composition is simultaneously stretched in the MD and the TD.

The sheet-shaped polyolefin resin composition can be stretched by drawing the sheet-shaped polyolefin resin composition while chucking its edges. Alternatively, the sheet-shaped polyolefin resin composition can be stretched by causing respective rotational speeds of rollers, each for transferring the sheet-shaped polyolefin composition, to be different from each other. Alternatively, the sheet-shaped polyolefin resin composition can be stretched by rolling the sheet-shaped polyolefin resin composition with use of a pair of rollers.

In the step (D), a stretch ratio at which the sheet-shaped polyolefin resin composition is stretched in the MD is preferably not less than 3.0 times and not more than 7.0 times, more preferably not less than 4.5 times and not more than 6.5 times. A stretch ratio at which the sheet-shaped polyolefin resin composition, having been stretched in the MD, is further stretched in the TD is preferably not less than 3.0 times and not more than 7.0 times, more preferably not less than 4.5 times and not more than 6.5 times.

A temperature at which the sheet-shaped polyolefin resin composition is stretched is preferably not higher than 130° C., and more preferably 110° C. to 120° C.

In the step (E), the cleaning liquid is not limited to any particular one, provided that the cleaning liquid is a solvent which allows removal of the plasticizer and the like. Examples of the cleaning liquid include: aliphatic hydrocarbons such as heptane, octane, nonane, and decane; and halogenated hydrocarbons such as methylene chloride, chloroform, dichloroethane, and 1,2-dichloropropane.

In the step (F), drying and heat fixing are carried out by heat-treating the cleaned polyolefin resin composition at a specific temperature.

The drying and the heat fixing are usually carried out under atmospheric air with use of an air blowing dryer, a heating roller, or the like.

The drying and the heat fixing are carried out at a temperature of preferably not lower than 100° C. and not higher than 150° C., more preferably not lower than 110° C. and not higher than 140° C., still more preferably not lower than 120° C. and not higher than 135° C. so that (a) a degree of oxidization of the resin wall inside the polyolefin porous film is further finely adjusted and (b) the interaction between (i) the charge carriers and (ii) the resin wall inside the polyolefin porous film is suitably controlled. Furthermore, the drying and the heat fixing are carried out for preferably not less than 1 minute and not more than 60 minutes, more preferably not less than 1 minute and not more than 30 minutes.

Embodiment 2

A nonaqueous electrolyte secondary battery separator in accordance with Embodiment 2 of the present invention is a nonaqueous electrolyte secondary battery separator, in accordance with Embodiment 1 of the present invention, further including an insulating porous layer which is provided on one surface or each of both surfaces of a polyolefin porous film. Accordingly, the nonaqueous electrolyte secondary battery separator in accordance with Embodiment 2 of the present invention includes the polyolefin porous film constituting the above-described nonaqueous electrolyte secondary battery separator in accordance with Embodiment 1 of the present invention. Note that the nonaqueous electrolyte secondary battery separator in accordance with Embodiment 2 of the present invention is hereinafter also referred to as a laminated body.

[Insulating Porous Layer]

The insulating porous layer constituting the nonaqueous electrolyte secondary battery separator in accordance with an embodiment of the present invention is typically a resin layer containing a resin. The insulating porous layer is preferably a heat-resistant layer or an adhesive layer. The insulating porous layer (hereinafter, also referred to as simply a "porous layer") preferably contains a resin that is insoluble in an electrolyte of a battery and that is electrochemically stable when the battery is in normal use.

The porous layer is provided on one surface or each of both surfaces of the nonaqueous electrolyte secondary battery separator as needed. In a case where the porous layer is provided on one surface of the polyolefin porous film, the porous layer is preferably provided on a surface of the polyolefin porous film which surface is to face a positive electrode of a nonaqueous electrolyte secondary battery to be produced, more preferably on a surface of the polyolefin porous film which surface is to come into contact with the positive electrode.

Examples of the resin constituting the porous layer include polyolefins; (meth)acrylate-based resins; fluorine-containing resins; polyamide-based resins; polyimide-based resins; polyester-based resins; rubbers; resins each having a melting point or a glass transition temperature of not lower than 180° C.; and water-soluble polymers.

Of these resins, polyolefins, polyester-based resins, acrylate-based resins, fluorine-containing resins, polyamide-based resins, and water-soluble polymers are preferable. Of the polyamide-based resins, wholly aromatic polyamides (aramid resins) are preferable. Of the polyester-based resins, polyarylates and liquid crystal polyesters are preferable.

The porous layer may contain fine particles. The term "fine particles" herein means organic fine particles or inorganic fine particles, generally referred to as a filler. Therefore, in a case where the porous layer contains fine particles, the above-described resin contained in the porous layer functions as a binder resin which binds (i) fine particles together and (ii) the fine particles and a porous film. The fine particles are preferably electrically insulating fine particles.

Examples of the organic fine particles contained in the porous layer include resin fine particles.

Specific examples of the inorganic fine particles contained in the porous layer include fillers each made of an inorganic matter such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. These inorganic fine particles are electrically insulating fine particles. Of these fine particles, the porous layer may contain only one kind of fine particles or may alternatively contain two or more kinds of fine particles in combination.

Of the above fine particles, fine particles made of an inorganic matter are suitable. More preferable are fine particles made of an inorganic oxide such as silica, calcium oxide, magnesium oxide, titanium oxide, alumina, mica, zeolite, aluminum hydroxide, or boehmite. Still more preferable are fine particles made of at least one kind selected from the group consisting of silica, magnesium oxide, titanium oxide, aluminum hydroxide, boehmite, and alumina. Particularly preferable are fine particles made of alumina.

The porous layer contains the fine particles in an amount of preferably 1% by volume to 99% by volume, and more preferably 5% by volume to 95% by volume, with respect to 100% by volume of the porous layer. In a case where the amount of the fine particles falls within the above range, it is less likely that a void, which is formed when the fine particles come into contact with each other, is blocked by the resin or the like. This allows the porous layer to achieve sufficient ion permeability and an appropriate weight per unit area.

The porous layer may contain two or more kinds of fine particles in combination which differ from each other in particle or specific surface area.

The porous layer has a thickness of preferably 0.5 µm to 15 µm (per single porous layer), and more preferably 2 µm to 10 µm (per single porous layer).

In a case where the thickness of the porous layer is less than 1 µm, it may not be possible to sufficiently prevent an internal short circuit caused by breakage or the like of a battery. In addition, an amount of an electrolyte to be retained by the porous layer may decrease. In contrast, in a case where a total thickness of porous layers on both surfaces of the nonaqueous electrolyte secondary battery separator is more than 30 µm, then a rate characteristic or a cycle characteristic may deteriorate.

The porous layer has a weight per unit area (per single porous layer) of preferably 1 $g/m^2$ to 20 $g/m^2$, and more preferably 4 $g/m^2$ to 10 $g/m^2$.

A volume per square meter of a porous layer constituent component contained in the porous layer (per single porous layer) is preferably 0.5 $cm^3$ to 20 $cm^3$, more preferably 1 $cm^3$ to 10 $cm^3$, and still more preferably 2 $cm^3$ to 7 $cm^3$.

The porous layer has a porosity of preferably 20% by volume to 90% by volume, and more preferably 30% by volume to 80% by volume, so as to achieve sufficient ion permeability. Pores which the porous layer has each have a pore diameter of preferably not more than 3 µm, and more preferably not more than 1 µm so that the laminated body can achieve sufficient ion permeability.

The laminated body in accordance with an embodiment of the present invention has a film thickness of preferably 5.5 µm to 45 µm, and more preferably 6 µm to 25 µm.

The laminated body in accordance with an embodiment of the present invention has an air permeability of preferably 30 sec/100 mL to 1000 sec/100 mL, and more preferably 50 sec/100 mL to 800 sec/100 mL, in terms of Gurley values.

The laminated body in accordance with an embodiment of the present invention may include, in addition to the polyolefin porous film and the insulating porous layer, a publicly known porous film (porous layer) such as a heat-resistant layer, an adhesive layer, and a protective layer as needed, provided that the publicly known porous film does not prevent the object of the present invention from being attained.

The laminated body in accordance with an embodiment of the present invention has ion permeability barrier energy falling within a specific range per unit film thickness which specific range is identical to that of the ion permeability barrier energy of the nonaqueous electrolyte secondary battery separator in accordance with Embodiment 1. Therefore, it is possible to cause a resistance increasing rate to be low in a case where a nonaqueous electrolyte secondary battery, including the laminated body, is repeatedly subjected to a charge-discharge cycle, and accordingly possible to enhance a cycle characteristic of the nonaqueous electrolyte secondary battery. The ion permeability barrier energy per unit film thickness of the laminated body can be controlled by, for example, adjusting ion permeability barrier energy per unit film thickness of the polyolefin porous film included in the laminated body by the above-described method.

[Method for Producing Laminated Body]

The laminated body in accordance with an embodiment of the present invention can be produced by, for example, a method in which (i) a coating solution (later described) is applied to a surface of a polyolefin porous film and then (ii) the coating solution is dried so that the insulating porous layer is deposited.

Note that, before the coating solution is applied to the surface of the polyolefin porous film, the surface to which the coating solution is to be applied can be subjected to a hydrophilization treatment as needed.

The coating solution used in a method for producing the laminated body in accordance with an embodiment of the present invention can be prepared typically by (i) dissolving, in a solvent, a resin that can be contained in the porous layer and (ii) dispersing, in the solvent, fine particles that can be contained in the porous layer. Note, here, that the solvent in which the resin is to be dissolved also serves as a dispersion medium in which the fine particles are to be dispersed. Note, here, that the resin can be alternatively contained as an emulsion in the coating solution, instead of being dissolved in the solvent.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) include water and organic solvents. Of these solvents, only one kind of solvent can be used. Alternatively, two or more kinds of solvents can be used in combination.

The coating solution may be formed by any method, provided that the coating solution can meet conditions, such as a resin solid content (resin concentration) and a fine particle amount, which are necessary to obtain a desired porous layer. Specific examples of a method for forming the coating solution include a mechanical stirring method, an ultrasonic dispersion method, a high-pressure dispersion method, and a media dispersion method. Note that the coating solution may contain, as a component other than the resin and the fine particles, an additive such as a disperser, a plasticizer, a surfactant, and a pH adjustor, provided that the additive does not prevent the object of the present invention from being attained. Note that the additive may be contained in an amount that does not prevent the object of the present invention from being attained.

A method for applying the coating solution to the polyolefin porous film, that is, a method for forming the porous layer on the surface of the polyolefin porous film is not limited to any particular one. Examples of the method for forming the porous layer include: a method in which a coating solution is applied directly to a surface of a polyolefin porous film and then a solvent (dispersion medium) is removed; a method in which a coating solution is applied to an appropriate support, a solvent (dispersion medium) is removed so that a porous layer is formed, the porous layer is pressure-bonded to a polyolefin porous film, and then the support is peeled off; and a method in which a coating solution is applied to a surface of an appropriate support, a polyolefin porous film is pressure-bonded to that surface of the support, the support is peeled off, and then a solvent (dispersion medium) is removed.

The coating solution can be applied by a conventionally publicly known method. Specific examples of such a method include a gravure coater method, a dip coater method, a bar coater method, and a die coater method.

The solvent (dispersion medium) is generally removed by drying. The solvent (dispersion medium) contained in the coating solution may be replaced with another solvent before drying.

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention includes a positive electrode, a nonaqueous electrolyte secondary battery separator in accordance with Embodiment 1 or 2 of the present invention, and a negative electrode which are disposed in this order.

A nonaqueous electrolyte secondary battery in accordance with Embodiment 4 of the present invention includes a nonaqueous electrolyte secondary battery separator in accordance with Embodiment 1 or 2 of the present invention.

A nonaqueous electrolyte secondary battery in accordance with an embodiment of the present invention can be, for example, a nonaqueous secondary battery which achieves an electromotive force through doping with and dedoping of lithium, and can include a nonaqueous electrolyte secondary battery member including a positive electrode, a nonaqueous electrolyte secondary battery separator in accordance with an embodiment of the present invention, and a negative electrode which are disposed in this order. Alternatively, the nonaqueous electrolyte secondary battery in accordance with an embodiment of the present invention can be, for example, a nonaqueous secondary battery which achieves an electromotive force through doping with and dedoping of lithium, and can be a lithium-ion secondary battery which includes a nonaqueous electrolyte secondary battery member including a positive electrode, a porous layer, a nonaqueous electrolyte secondary battery separator in accordance with an embodiment of the present invention, and a negative electrode which are disposed in this order, that is, a lithium-ion secondary battery which includes a nonaqueous electrolyte secondary battery member including a positive electrode, a nonaqueous electrolyte secondary battery separator in accordance with Embodiment 2 of the present invention, and a negative electrode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is typically arranged such that a battery element is enclosed in an exterior member, the battery element including (i) a structure in which the negative electrode and the positive electrode face each other via the nonaqueous electrolyte secondary battery separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

The nonaqueous electrolyte secondary battery member in accordance with an embodiment of the present invention includes the nonaqueous electrolyte secondary battery separator in accordance with an embodiment of the present invention. Therefore, in a case where the nonaqueous electrolyte secondary battery member is included in a nonaqueous electrolyte secondary battery, it is possible to suppress an increase in resistance after a charge-discharge cycle of the nonaqueous electrolyte secondary battery. The nonaqueous electrolyte secondary battery in accordance with an embodiment of the present invention includes the nonaqueous electrolyte secondary battery separator in accordance with an embodiment of the present invention which has ion permeability barrier energy adjusted so as to fall within a specific range per unit film thickness. Therefore, the nonaqueous electrolyte secondary battery is excellent in cycle characteristic.

<Positive Electrode>

The positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode include a positive electrode sheet having a structure in which an active material layer containing a positive electrode active material and a binder resin is formed on a current collector. The active material layer may further contain an electrically conductive agent and/or a binding agent.

Examples of the positive electrode active material include a material capable of being doped with and dedoped of lithium ions. Specific examples of such a material include a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. Of these electrically conductive agents, the active material layer may contain only one kind of electrically conductive agent or may alternatively contain two or more kinds of electrically conductive materials in combination.

Examples of the binding agent include: fluorine-based resins such as polyvinylidene fluoride; acrylic resin; and styrene butadiene rubber. Note that the binding agent serves also as a thickener.

Examples of the current collector included in the positive electrode (i.e., positive electrode current collector) include electric conductors such as Al, Ni, and stainless steel. Of these electric conductors, Al is more preferable because Al is easily processed into a thin film and is inexpensive.

Examples of a method for producing the positive electrode sheet include: a method in which a positive electrode active material, an electrically conductive agent, and a binding agent are pressure-molded on a positive electrode current collector; and a method in which (i) a positive electrode active material, an electrically conductive agent, and a binding agent are formed into a paste with use of an appropriate organic solvent, (ii) a positive electrode current collector is coated with the paste, and (iii) the paste is dried and then pressured so that the paste is firmly fixed to the positive electrode current collector.

<Negative Electrode>

The negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode include a negative electrode sheet having a structure in which an active material layer containing a negative electrode active material and a binder resin is formed on a current collector. The active material layer may further contain an electrically conductive agent.

Examples of the negative electrode active material include: a material capable of being doped with and dedoped of lithium ions; lithium metal; and lithium alloy. Examples of such a material include carbonaceous materials such as natural graphite, artificial graphite, cokes, carbon black, and pyrolytic carbons.

Examples of the current collector included in the negative electrode (i.e., negative electrode current collector) include electric conductors such as Cu, Ni, and stainless steel. Of these examples, Cu is more preferable because Cu is not easily alloyed with lithium particularly in a lithium-ion secondary battery and is easily processed into a thin film.

Examples of a method for producing the negative electrode sheet include: a method in which a negative electrode active material is pressure-molded on a negative electrode current collector; and a method in which (i) a negative electrode active material is formed into a paste with use of an appropriate organic solvent, (ii) a negative electrode current collector is coated with the paste, and (iii) the paste is dried and then pressured so that the paste is firmly fixed to the negative electrode current collector. The paste preferably contains an electrically conductive agent and a binding agent.

<Nonaqueous Electrolyte>

A nonaqueous electrolyte in the nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be one that is prepared by, for example, dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. Of these lithium salts, only one kind of lithium salt may be used or two or more kinds of lithium salts may be alternatively used in combination.

Examples of the organic solvent to be contained in the nonaqueous electrolyte include carbonates, ethers, esters, nitriles, amides, carbamates, sulfur-containing compounds, and fluorine-containing organic solvents each obtained by introducing a fluorine group into any of these organic solvents. Of these organic solvents, only one kind of organic solvent may be used or two or more kinds of organic solvents may be alternatively used in combination.

<Method for Producing Nonaqueous Electrolyte Secondary Battery Member and Method for Producing Nonaqueous Electrolyte Secondary Battery>

Examples of a method for producing the nonaqueous electrolyte secondary battery member in accordance with an embodiment of the present invention include a method in which a positive electrode, a nonaqueous electrolyte secondary battery separator in accordance with an embodiment of the present invention, and a negative electrode are disposed in this order.

Examples of a method for producing the nonaqueous electrolyte secondary battery in accordance with an embodiment of the present invention include a method in which (i) a nonaqueous electrolyte secondary battery member is formed by the above-described method, (ii) the nonaqueous electrolyte secondary battery member is placed in a container which is to serve as a housing of a nonaqueous electrolyte secondary battery, (iii) the container is filled with a nonaqueous electrolyte, and then (iv) the container is hermetically sealed while pressure inside the container is reduced.

EXAMPLES

The present invention will be described in more detail with reference to Examples and Comparative Example below. Note, however, that the present invention is not limited to those Examples.

[Measurement Methods]

Physical properties and the like of a polyolefin porous film produced in each of Examples and Comparative Example were measured by respective methods below. Furthermore, a cycle characteristic of a nonaqueous electrolyte secondary battery produced in each of Examples and Comparative Example was measured by a method below.

(1) Film Thickness (Unit: μm)

A film thickness of the polyolefin porous film was measured with use of a high-accuracy digital length measuring machine (VL-50) manufactured by Mitutoyo Corporation.

(2) Air Permeability (Unit: Sec/100 mL)

An air permeability of the polyolefin porous film was measured in accordance with JIS P8117.

(3) Ion Permeability Barrier Energy Per Unit Film Thickness (Unit: J/Mol/μm)

The polyolefin porous film was cut into a disc-shaped piece having a diameter of 17 mm. The disc-shaped piece was sandwiched between two SUS plates each having a thickness of 0.5 mm and a diameter of 15.5 mm. An electrolyte was injected into a cell thus obtained so as to prepare a coin cell (CR2032 type). Here, as the electrolyte, a solution was used which was obtained by dissolving $LiPF_6$ in a mixed solvent, in which ethylene carbonate (EC), ethyl methyl carbonate (EMC), and diethyl carbonate (DEC) were mixed at a volume ratio of 3:5:2, so that the $LiPF_6$ had a concentration of 1 mol/L.

The coin cell thus prepared was placed in a thermostatic bath in which a temperature was set to a given temperature (later described), and a Nyquist plot was obtained with use of an alternating current impedance apparatus (FRA 1255B) and CellTest System (1470E), each manufactured by Solartron, while a frequency was set to 1 MHz to 0.1 Hz and a voltage amplitude was set to 10 mV. A solution resistance $r_0$ of the polyolefin porous film at the given temperature was determined from a value of an X intercept, and then ion permeability barrier energy was calculated with use of the following expressions (1) and (2). Note that the temperature of the thermostatic bath was set to 50° C., 25° C., 5° C., and −10° C.

Note, here, the ion permeability barrier energy is represented by the following expression (1).

$$k=1/r_0=A \exp(-Ea/RT) \tag{1}$$

Ea: ion permeability barrier energy (J/mol)
k: a reaction constant
$r_0$: a solution resistance (Ω)
A: a frequency factor
R: a gas constant=8.314 J/mol/K
T: a temperature of a thermostatic bath (K)

In a case where natural logarithms of both sides of the expression (1) are taken, the following expression (2) is obtained. On the basis of the expression (2), −Ea/R was determined which indicated a slope of a straight line obtained by (i) plotting $\ln(1/r_0)$ with respect to a reciprocal of each temperature and (ii) applying a least squares method to a plot thus obtained, and then Ea was calculated by multiplying a value of −Ea/R by a gas constant R. Subsequently, Ea thus calculated was divided by the film thickness of the polyolefin porous film. In this way, the ion permeability barrier energy per unit film thickness was calculated.

$$\ln(1/k)=\ln(1/r_0)=\ln A - Ea/RT \qquad (2)$$

(4) Cycle Characteristic

The cycle characteristic of the nonaqueous electrolyte secondary battery produced in each of Examples and Comparative Example was measured by a method including the following steps (A) through (E). Specifically, an electrode resistance increasing rate after 100 charge-discharge cycles was measured by the method. Note that how to calculate an electrode resistance will be described in detail in the step (B).

(A) Initial Charge-Discharge Test

A new nonaqueous electrolyte secondary battery, which employed the nonaqueous electrolyte secondary battery separator produced in each of Examples and Comparative Example and which had not been subjected to any charge-discharge cycle, was subjected to 4 initial charge-discharge cycles at 25° C. Each of the 4 initial charge-discharge cycles was carried out (i) at a voltage ranging from 2.7 V to 4.1 V, (ii) with CC-CV charge at a charge current value of 0.2 C (terminal current condition: 0.02 C), and (iii) with CC discharge at a discharge current value of 0.2 C. Note that 1 C is defined as a value of an electric current at which a rated capacity based on a discharge capacity at 1 hour rate is discharged for 1 hour. The same applies to the following description. Note that the "CC-CV charge" is a charging method in which (i) a battery is charged at a constant electric current set, (ii) after a certain voltage is reached, the certain voltage is maintained while the electric current is reduced. Note also that the "CC discharge is a discharging method in which a battery is discharged at a constant electric current set until a certain voltage is reached. The same applies to the following description.

(B) Measurement of Initial Electrode Resistance $R_1$

After the initial charge-discharge test, a voltage having an amplitude of 10 mV was applied to the nonaqueous electrolyte secondary battery at a room temperature of 25° C. with use of an LCR meter (product name: chemical impedance meter, model: 3532-80) manufactured by HIOKI E.E. CORPORATION, and a Nyquist plot was obtained. Intersection points of the Nyquist plot and an X axis, that is, X intercepts were read as (i) a solution resistance $R_0$ and (ii) a resistance value $R_{10}$Hz of a real part of a measurement frequency of 10 Hz. Note that the solution resistance $R_0$ and the resistance value $R_{10}$Hz thus read are each a resistance value after the initial charge-discharge test. Then, $R_1$ was obtained by $R_{10Hz}-R_0$. Note, here, that $R_1$ represents an initial electrode resistance.

(C) 100 Charge-Discharge Cycles

After the step (B), the nonaqueous electrolyte secondary battery was subjected to 100 charge-discharge cycles at 55° C. Each of the 100 charge-discharge cycles was carried out (i) at a voltage ranging from 2.7 V to 4.2 V, (ii) with CC-CV charge at a charge current value of 1 C (terminal current condition: 0.02 C), and (iii) with CC discharge at a discharge current value of 10 C.

(D) Measurement of Electrode Resistance $R'_1$ after 100 Charge-Discharge Cycles As in the step (B), (i) a solution resistance $R_{0(100cyc)}$ after the 100 charge-discharge cycles and (ii) a resistance value $R_{10Hz(100cyc)}$ of a real part of a measurement frequency 10 Hz after the 100 charge-discharge cycles were measured, and then an electrode resistance $R'_1$ after the 100 charge-discharge cycles was calculated by the following expression (3).

$$R'_1 = R_{10Hz(100cyc)} - R_{0(100cyc)} \qquad (3)$$

(E) Electrode Resistance Increasing Rate after 100 Charge-Discharge Cycles

An electrode resistance increasing rate after the 100 charge-discharge cycles was calculated, by the following expression (4), with use of a value of $R_1$ measured in the step (B) and a value of $R'_1$ measured in the step (D).

$$R'_1/R_1 \times 100 = \text{electrode resistance increasing rate after 100 charge-discharge cycles (\%)} \qquad (4)$$

Note that the fact that the electrode resistance increasing rate after 100 charge-discharge cycles is 100% means that an electrode resistance after 100 charge-discharge cycles is not different from an electrode resistance before the 100 charge-discharge cycles (initial electrode resistance $R_1$). The fact that the electrode resistance increasing rate after the 100 charge-discharge cycles is beyond 100% means that the electrode resistance after the 100 charge-discharge cycles is greater than the electrode resistance before the 100 charge-discharge cycles.

Example 1

[Production of Nonaqueous Electrolyte Secondary Battery Separator]

First, 18 parts by weight of an ultra-high molecular weight polyethylene powder (HI-ZEX MILLION 145M, manufactured by Mitsui Chemicals, Inc.) and 2 parts by weight of a petroleum resin having many tertiary hydrogen atoms in its structure (alicyclic saturated hydrocarbon resin having a softening point of 125° C.) were prepared. Those powders were pulverized and mixed by a blender. Here, pulverization was carried out until particles of the powders were identical in particle diameter. A mixture 1 was thus obtained.

Next, the mixture 1 was fed to a twin screw kneading extruder with use of a quantitative feeder, and then melt-kneaded in the twin screw kneading extruder. A temperature inside the twin screw kneading extruder immediately before liquid paraffin was fed to the twin screw kneading extruder was set to 150° C., and 80 parts by weight of the liquid paraffin was side-fed to the twin screw kneading extruder with use of a pump. Note that the "temperature inside the twin screw kneading extruder" indicates a temperature inside a segment-type barrel of a twin screw kneading extruder. Note also that the "segment-type barrel" indicates a block-type barrel which can be connected to a different block-type barrel(s) so that connected block-type barrels have an intended total length.

Subsequently, a resultant melt-kneaded mixture was extruded through a T-die, in which a temperature was set to 210° C., via a gear pump, and shaped into a sheet to obtain a sheet-shaped polyolefin resin composition 1. The sheet-shaped polyolefin resin composition 1 thus obtained was wound on a cooling roller so as to be cooled down. After the sheet-shaped polyolefin resin composition 1 was cooled down, the sheet-shaped polyolefin resin composition 1 was stretched by a sequential stretching method, that is, the sheet-shaped polyolefin resin composition 1 was stretched in an MD at a stretch ratio of 6.4 times and then stretched in a TD at a stretch ratio of 6.0 times to obtain a stretched polyolefin resin composition 2.

The stretched polyolefin resin composition 2 was cleaned with use of a cleaning liquid (methylene chloride). A resultant cleaned sheet (sheet-shaped polyolefin resin composition) was left to stand still for 25 minutes in a ventilation oven, in which a temperature was set to 133° C., so that the cleaned sheet was dried and heat-fixed. A polyolefin porous film was thus obtained. The polyolefin porous film thus obtained was referred to as a polyolefin porous film 1. The polyolefin porous film 1 was employed as a nonaqueous electrolyte secondary battery separator 1.

Thereafter, physical properties of the polyolefin porous film 1 thus obtained were measured by the respective above-described methods. The polyolefin porous film 1 had a film thickness of 13 μm and an air permeability of 156 sec/100 mL. Table 1 shows the physical properties of the polyolefin porous film 1.

[Production of Nonaqueous Electrolyte Secondary Battery]

(Production of Positive Electrode)

A commercially available positive electrode was used which had been produced by applying $LiNi_{0.5}Mn_{0.3}Co_{0.2}$/an electrically conductive material/PVDF (weight ratio of 92/5/3) to aluminum foil. The aluminum foil of the commercially available positive electrode was cut so that (i) a first portion of the aluminum foil, on which first portion a positive electrode active material layer was formed, had a size of 40 mm×35 mm and (ii) a second portion of the aluminum foil, on which second portion no positive electrode active material layer was formed and which second portion had a width of 13 mm, remained on an outer periphery of the first portion. A positive electrode thus obtained was used. The positive electrode active material layer had a thickness of 58 μm and a density of 2.50 g/cm$^3$.

(Production of Negative Electrode)

A commercially available negative electrode was used which had been produced by applying graphite/a styrene-1,3-butadiene copolymer/sodium carboxymethylcellulose (weight ratio of 98/1/1) to copper foil. The copper foil of the commercially available negative electrode was cut so that (i) a first portion of the copper foil, on which first portion a negative electrode active material layer was formed, had a size of 50 mm×40 mm and (ii) a second portion of the copper foil, on which second portion no negative electrode active material layer was formed and which second portion had a width of 13 mm, remained on an outer periphery of the first portion. A negative electrode thus obtained was used. The negative electrode active material layer had a thickness of 49 μm and a density of 1.40 g/cm$^3$.

(Assembly of Nonaqueous Electrolyte Secondary Battery)

A nonaqueous electrolyte secondary battery was produced by the following method with use of the positive electrode, the negative electrode, and the nonaqueous electrolyte secondary battery separator 1.

The positive electrode, the nonaqueous electrolyte secondary battery separator 1, and the negative electrode were disposed (arranged) in this order in a laminate pouch to obtain a nonaqueous electrolyte secondary battery member 1. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode).

Subsequently, the nonaqueous electrolyte secondary battery member 1 was put into a bag which had been formed by disposing an aluminum layer on a heat seal layer. Further, 0.25 mL of a nonaqueous electrolyte was put into the bag. The nonaqueous electrolyte was a nonaqueous electrolyte prepared by dissolving $LiPF_6$ in a mixed solvent, in which ethylene carbonate, ethyl methyl carbonate, and diethyl carbonate were mixed at 3:5:2 (volume ratio), so that the $LiPF_6$ had a concentration of 1 mol/L. Then, a nonaqueous electrolyte secondary battery 1 was produced by heat sealing the bag while reducing pressure in the bag.

Thereafter, a cycle characteristic of the nonaqueous electrolyte secondary battery 1 obtained by the above method, that is, an electrode resistance increasing rate (%) after 100 charge-discharge cycles of the nonaqueous electrolyte secondary battery 1 was measured. Table 1 shows a result of measuring the cycle characteristic (electrode resistance increasing rate).

Example 2

[Production of Nonaqueous Electrolyte Secondary Battery Separator]

A polyolefin porous film was obtained as in Example 1, except that (i) a temperature inside a twin screw kneading extruder immediately before liquid paraffin was fed to the twin screw kneading extruder was set to 150° C., (ii) heptane was used as a cleaning liquid, and (iii) a sheet cleaned with use of the cleaning liquid (heptane) was dried and heat-fixed at 133° C. for 15 minutes. The polyolefin porous film thus obtained was referred to as a polyolefin porous film 2. The polyolefin porous film 2 was employed as a nonaqueous electrolyte secondary battery separator 2.

Thereafter, physical properties of the polyolefin porous film 2 thus obtained were measured by the respective above-described methods. The polyolefin porous film 2 had a film thickness of 16 μm and an air permeability of 113 sec/100 mL. Table 1 shows the physical properties of the polyolefin porous film 2.

[Production of Nonaqueous Electrolyte Secondary Battery]

A nonaqueous electrolyte secondary battery was produced as in Example 1, except that the nonaqueous electrolyte secondary battery separator 2 was used instead of the nonaqueous electrolyte secondary battery separator 1. The nonaqueous electrolyte secondary battery thus produced was referred to as a nonaqueous electrolyte secondary battery 2.

Thereafter, a cycle characteristic of the nonaqueous electrolyte secondary battery 2 obtained by the above-described method, that is, an electrode resistance increasing rate (%) after 100 charge-discharge cycles of the nonaqueous electrolyte secondary battery 2 was measured. Table 1 shows a result of measuring the cycle characteristic (electrode resistance increasing rate).

Example 3

[Production of Nonaqueous Electrolyte Secondary Battery Separator]

A polyolefin porous film was obtained as in Example 1, except that (i) a temperature inside a twin screw kneading extruder immediately before liquid paraffin was fed to the twin screw kneading extruder was set to 150° C., (ii) heptane was used as a cleaning liquid, and (iii) a sheet cleaned with use of the cleaning liquid (heptane) was dried and heat-fixed at 120° C. for 1 minute. The polyolefin porous film thus obtained was referred to as a polyolefin porous film 3. The polyolefin porous film 3 was employed as a nonaqueous electrolyte secondary battery separator 3.

Thereafter, physical properties of the polyolefin porous film 3 thus obtained were measured by the respective above-described methods. The polyolefin porous film 3 had a film thickness of 18 μm and an air permeability of 118 sec/100 mL. Table 1 shows the physical properties of the polyolefin porous film 3.

[Production of Nonaqueous Electrolyte Secondary Battery]

A nonaqueous electrolyte secondary battery was produced as in Example 1, except that the nonaqueous electrolyte secondary battery separator 3 was used instead of the nonaqueous electrolyte secondary battery separator 1. The nonaqueous electrolyte secondary battery thus produced was referred to as a nonaqueous electrolyte secondary battery 3.

Thereafter, a cycle characteristic of the nonaqueous electrolyte secondary battery 3 obtained by the above-described method, that is, an electrode resistance increasing rate (%) after 100 charge-discharge cycles of the nonaqueous electrolyte secondary battery 3 was measured. Table 1 shows a result of measuring the cycle characteristic (electrode resistance increasing rate).

Example 4

[Production of Nonaqueous Electrolyte Secondary Battery Separator]

A polyolefin porous film was obtained as in Example 1, except that (i) a temperature inside a twin screw kneading extruder immediately before liquid paraffin was fed to the twin screw kneading extruder was set to 150° C., (ii) heptane was used as a cleaning liquid, and (iii) a sheet cleaned with use of the cleaning liquid (heptane) was dried and heat-fixed at 100° C. for 8 minutes. The polyolefin porous film thus obtained was referred to as a polyolefin porous film 4. The polyolefin porous film 4 was employed as a nonaqueous electrolyte secondary battery separator 4.

Thereafter, physical properties of the polyolefin porous film 4 thus obtained were measured by the respective above-described methods. The polyolefin porous film 4 had a film thickness of 17 μm and an air permeability of 124 sec/100 mL. Table 1 shows the physical properties of the polyolefin porous film 4.

[Production of Nonaqueous Electrolyte Secondary Battery]

A nonaqueous electrolyte secondary battery was produced as in Example 1, except that the nonaqueous electrolyte secondary battery separator 4 was used instead of the nonaqueous electrolyte secondary battery separator 1. The nonaqueous electrolyte secondary battery thus produced was referred to as a nonaqueous electrolyte secondary battery 4.

Thereafter, a cycle characteristic of the nonaqueous electrolyte secondary battery 4 obtained by the above-described method, that is, an electrode resistance increasing rate (%) after 100 charge-discharge cycles of the nonaqueous electrolyte secondary battery 4 was measured. Table 1 shows a result of measuring the cycle characteristic (electrode resistance increasing rate).

Example 5

[Production of Nonaqueous Electrolyte Secondary Battery Separator]

A polyolefin porous film was obtained as in Example 1, except that (i) 2 parts by weight of an alicyclic saturated hydrocarbon resin having a softening point of 90° C. was used as a petroleum resin having many tertiary hydrogen atoms in its structure, (ii) a temperature inside a twin screw kneading extruder immediately before liquid paraffin was fed to the twin screw kneading extruder was set to 144° C., (iii) heptane was used as a cleaning liquid, and (iv) a sheet cleaned with use of the cleaning liquid (heptane) was dried and heat-fixed at 134° C. for 15 minutes. The polyolefin porous film thus obtained was referred to as a polyolefin porous film 5. The polyolefin porous film 5 was employed as a nonaqueous electrolyte secondary battery separator 5.

Thereafter, physical properties of the polyolefin porous film 5 thus obtained were measured by the respective above-described methods. The polyolefin porous film 5 had a film thickness of 13 μm and an air permeability of 127 sec/100 mL. Table 1 shows the physical properties of the polyolefin porous film 5.

[Production of Nonaqueous Electrolyte Secondary Battery]

A nonaqueous electrolyte secondary battery was produced as in Example 1, except that the nonaqueous electrolyte secondary battery separator 5 was used instead of the nonaqueous electrolyte secondary battery separator 1. The nonaqueous electrolyte secondary battery thus produced was referred to as a nonaqueous electrolyte secondary battery 5.

Thereafter, a cycle characteristic of the nonaqueous electrolyte secondary battery 5 obtained by the above-described method, that is, an electrode resistance increasing rate (%) after 100 charge-discharge cycles of the nonaqueous electrolyte secondary battery 5 was measured. Table 1 shows a result of measuring the cycle characteristic (electrode resistance increasing rate).

Example 6

[Production of Nonaqueous Electrolyte Secondary Battery Separator]

A polyolefin porous film was obtained as in Example 1, except that (i) 2 parts by weight of an alicyclic saturated hydrocarbon resin having a softening point of 90° C. was used as a petroleum resin having many tertiary hydrogen atoms in its structure, (ii) a temperature inside a twin screw kneading extruder immediately before liquid paraffin was fed to the twin screw kneading extruder was set to 144° C., (iii) heptane was used as a cleaning liquid, and (iv) a sheet cleaned with use of the cleaning liquid (heptane) was dried and heat-fixed at 120° C. for 1 minute. The polyolefin porous film thus obtained was referred to as a polyolefin porous film 6. The polyolefin porous film 6 was employed as a nonaqueous electrolyte secondary battery separator 6.

Thereafter, physical properties of the polyolefin porous film 6 thus obtained were measured by the respective above-described methods. The polyolefin porous film 6 had a film thickness of 22 μm and an air permeability of 126 sec/100 mL. Table 1 shows the physical properties of the polyolefin porous film 6.

[Production of Nonaqueous Electrolyte Secondary Battery]

A nonaqueous electrolyte secondary battery was produced as in Example 1, except that the nonaqueous electrolyte secondary battery separator 6 was used instead of the nonaqueous electrolyte secondary battery separator 1. The nonaqueous electrolyte secondary battery thus produced was referred to as a nonaqueous electrolyte secondary battery 6.

Thereafter, a cycle characteristic of the nonaqueous electrolyte secondary battery 6 obtained by the above-described method, that is, an electrode resistance increasing rate (%) after 100 charge-discharge cycles of the nonaqueous electrolyte secondary battery 6 was measured. Table 1 shows a result of measuring the cycle characteristic (electrode resistance increasing rate).

Comparative Example 1

[Production of Nonaqueous Electrolyte Secondary Battery Separator]

A polyolefin porous film was obtained as in Example 1, except that (i) 20 parts by weight of an ultra-high molecular weight polyethylene powder (HI-ZEX MILLION 145M, manufactured by Mitsui Chemicals, Inc.) was prepared solely and a petroleum resin was not prepared, (ii) a temperature inside a twin screw kneading extruder immediately before liquid paraffin was fed to the twin screw kneading extruder was set to 134° C., (iii) heptane was used as a cleaning liquid, and (iv) a sheet cleaned with use of the cleaning liquid (heptane) was dried and heat-fixed at 120° C. for 1 minute. The polyolefin porous film thus obtained was referred to as a polyolefin porous film 7. The polyolefin porous film 7 was employed as a nonaqueous electrolyte secondary battery separator 7.

Thereafter, physical properties of the polyolefin porous film 7 thus obtained were measured by the respective above-described methods. The polyolefin porous film 7 had a film thickness of 24 µm and an air permeability of 165 sec/100 mL. Table 1 shows the physical properties of the polyolefin porous film 7.

[Production of Nonaqueous Electrolyte Secondary Battery]

A nonaqueous electrolyte secondary battery was produced as in Example 1, except that the nonaqueous electrolyte secondary battery separator 7 was used instead of the nonaqueous electrolyte secondary battery separator 1. The nonaqueous electrolyte secondary battery thus produced was referred to as a nonaqueous electrolyte secondary battery 7.

Thereafter, a cycle characteristic of the nonaqueous electrolyte secondary battery 7 obtained by the above-described method, that is, an electrode resistance increasing rate (%) after 100 charge-discharge cycles of the nonaqueous electrolyte secondary battery 7 was measured. Table 1 shows a result of measuring the cycle characteristic (electrode resistance increasing rate).

[Results]

The following Table 1 shows (i) the physical properties of the nonaqueous electrolyte secondary battery separator (polyolefin porous film) produced in each of Examples 1 through 6 and Comparative Example 1 and (ii) the electrode resistance increasing rate (%) of the nonaqueous electrolyte secondary battery, produced in each of Examples 1 through 6 and Comparative Example 1, after the 100 charge-discharge cycles of the nonaqueous electrolyte secondary battery.

TABLE 1

| | Film thickness [µm] | Porosity [%] | Ion permeability barrier energy per unit film thickness [J/mol/µm] | Electrode resistance increasing rate after 100 charge-discharge cycles [%] |
|---|---|---|---|---|
| Example 1 | 13 | 33 | 736 | 249 |
| Example 2 | 16 | 41 | 618 | 337 |
| Example 3 | 18 | 55 | 375 | 276 |
| Example 4 | 17 | 63 | 466 | 243 |
| Example 5 | 13 | 36 | 779 | 306 |
| Example 6 | 22 | 61 | 323 | 329 |
| Comparative Example 1 | 24 | 58 | 289 | 471 |

CONCLUSION

It was found from Table 1 that the nonaqueous electrolyte secondary battery including the nonaqueous electrolyte secondary battery separator (polyolefin porous film), which was produced in each of Examples 1 through 6 and which had ion permeability barrier energy of not less than 300 J/mol/µm and not more than 900 J/mol/µm per unit film thickness, was low in electrode resistance increasing rate after the 100 charge-discharge cycles, as compared to the nonaqueous electrolyte secondary battery including the nonaqueous electrolyte secondary battery separator, which was produced in Comparative Example 1 and which had ion permeability barrier energy outside the above range per unit film thickness. That is, it was found from Table 1 that the nonaqueous electrolyte secondary battery including the nonaqueous electrolyte secondary battery separator which was produced in each of Examples 1 through 6 was more excellent in cycle characteristic than the nonaqueous electrolyte secondary battery including the nonaqueous electrolyte secondary battery separator which was produced in Comparative Example 1.

INDUSTRIAL APPLICABILITY

As has been described, a nonaqueous electrolyte secondary battery including a nonaqueous electrolyte secondary battery separator in accordance with an embodiment of the present invention is excellent in cycle characteristic. Therefore, the nonaqueous electrolyte secondary battery separator in accordance with an embodiment of the present invention is useful as a member of a nonaqueous electrolyte secondary battery.

The invention claimed is:

1. A nonaqueous electrolyte secondary battery separator comprising a polyolefin porous film, the nonaqueous electrolyte secondary battery separator having ion permeability barrier energy of not less than 300 J/mol/µm and not more than 900 J/mol/µm per unit film thickness, wherein the nonaqueous electrolyte secondary battery separator causes an electrode resistance increasing rate after 100 charge-discharge cycles of a nonaqueous electrolyte secondary battery containing the nonaqueous electrolyte secondary battery separator to be lower than an electrode resistance increasing rate after 100 charge-discharge cycles of a nonaqueous electrolyte secondary battery containing a reference nonaqueous electrolyte secondary battery separator comprising a polyolefin porous film and having an ion permeability battery energy of less than 300 J/mol/μm or more than 900 J/mol/μm per unit film thickness, wherein the electrode resistance increasing rate after 100 charge-discharge cycles is measured by subjecting the nonaqueous electrolyte secondary battery to 100 charge-discharge cycles each performed at 55° C. at a voltage ranging from 2.7 V to 4.2 V with CC-CV charge at a charge current value of 1 C, terminal current condition 0.02 C and with CC discharge at a discharge current value of 10 C, wherein CC-CV is a charging method comprising charging the battery at a constant electric current to a certain voltage and maintaining the certain voltage while the electric current is reduced; and wherein CC discharge is a discharging method comprising discharging the battery at a constant electric current until the certain voltage is reached.

2. The nonaqueous electrolyte secondary battery separator recited in claim 1, further comprising an insulating porous layer which is provided on one or both surfaces of the polyolefin porous film.

3. A nonaqueous electrolyte secondary battery member comprising:
 a positive electrode;
 a nonaqueous electrolyte secondary battery separator recited in claim 1; and
 a negative electrode,
 the positive electrode, the nonaqueous electrolyte secondary battery separator, and the negative electrode being disposed in this order.

4. A nonaqueous electrolyte secondary battery comprising a nonaqueous electrolyte secondary battery separator recited in claim 1.

5. A nonaqueous electrolyte secondary battery member comprising:
 a positive electrode;
 a nonaqueous electrolyte secondary battery separator recited in claim 2; and
 a negative electrode,
 the positive electrode, the nonaqueous electrolyte secondary battery separator, and the negative electrode being disposed in this order.

6. A nonaqueous electrolyte secondary battery comprising a nonaqueous electrolyte secondary battery separator recited in claim 2.

7. The nonaqueous electrolyte secondary battery separator recited in claim 2, wherein the insulating porous layer contains a polyamide-based resin.

8. The nonaqueous electrolyte secondary battery separator recited in claim 7, wherein the polyamide-based resin is a wholly aromatic polyamide.

* * * * *